United States Patent
Lee et al.

(10) Patent No.: US 9,932,649 B2
(45) Date of Patent: Apr. 3, 2018

(54) FIXED-TYPE ELECTRIC FURNACE AND MOLTEN STEEL PRODUCTION METHOD

(71) Applicant: POSCO, Pohang-si (KR)

(72) Inventors: Baek Lee, Gwangyang-si (KR); Geon Shin, Pohang-si (KR); Ji-Un Oh, Gwangyang-si (KR)

(73) Assignee: POSCO, Pohang-si (KR)

( * ) Notice: Subject to any disclaimer, the term of this patent is extended or adjusted under 35 U.S.C. 154(b) by 171 days.

(21) Appl. No.: 14/651,398

(22) PCT Filed: Dec. 28, 2012

(86) PCT No.: PCT/KR2012/011707
§ 371 (c)(1),
(2) Date: Jun. 11, 2015

(87) PCT Pub. No.: WO2014/098302
PCT Pub. Date: Jun. 26, 2014

(65) Prior Publication Data
US 2015/0344983 A1    Dec. 3, 2015

(30) Foreign Application Priority Data
Dec. 21, 2012 (KR) .................. 10-2012-0151535

(51) Int. Cl.
*C21C 5/52* (2006.01)
*F27B 3/08* (2006.01)
(Continued)

(52) U.S. Cl.
CPC .............. *C21C 5/52* (2013.01); *C21B 13/0006* (2013.01); *C21B 13/12* (2013.01); *C21B 13/14* (2013.01);
(Continued)

(58) Field of Classification Search
CPC ......... C21C 5/52; C21C 5/5217; C21C 5/527; C21C 5/565; C21C 5/5252; F27B 3/08;
(Continued)

(56) References Cited

U.S. PATENT DOCUMENTS 1,440,106 A * 12/1922 Rothert ................... C21B 13/12
373/2
4,244,732 A * 1/1981 Brauns .................... C21B 13/14
75/10.63
(Continued)

FOREIGN PATENT DOCUMENTS

| CN | 101665848 | 3/2010 |
| CN | 102212646 | 10/2011 |

(Continued)

OTHER PUBLICATIONS

JP H09-014865 A published Jan. 1997. Machine translation.*
(Continued)

*Primary Examiner* — George Wyszomierski
*Assistant Examiner* — Tima M McGuthry Banks
(74) *Attorney, Agent, or Firm* — Cantor Colburn LLP

(57) ABSTRACT

Provided are a fixed-type electric furnace enabling continuous operation which allows melting without the interruption of power supply and tapping in a fixed state, and a fixed-type electric furnace and a molten steel production method using same. The fixed-type electric furnace comprises: a preheating furnace which is disposed on the side of a melting furnace and preheats an iron source (scrap) using exhaust gas from the melting furnace; a supply means for supplying the iron source, which has been preheated in the preheating furnace, to the melting furnace; the melting furnace comprising electrodes for melting the preheated iron source; and a fixed-type discharge means for discharging molten steel which has been melted in the melting furnace, wherein the (Continued)

preheating furnace is integrally connected to the melting furnace.

8 Claims, 10 Drawing Sheets

(51) Int. Cl.
    *F27B 3/19*     (2006.01)
    *F27B 3/20*     (2006.01)
    *C21B 13/00*     (2006.01)
    *C21B 13/14*     (2006.01)
    *C21B 13/12*     (2006.01)
    *F27D 17/00*     (2006.01)
    *C21C 5/56*     (2006.01)
    *F27B 3/18*     (2006.01)
    *F27D 3/15*     (2006.01)
    *F27D 13/00*     (2006.01)

(52) U.S. Cl.
    CPC .......... *C21C 5/527* (2013.01); *C21C 5/5217* (2013.01); *C21C 5/5252* (2013.01); *C21C 5/565* (2013.01); *F27B 3/08* (2013.01); *F27B 3/085* (2013.01); *F27B 3/186* (2013.01); *F27B 3/19* (2013.01); *F27B 3/20* (2013.01); *F27B 3/205* (2013.01); *F27D 3/1509* (2013.01); *F27D 13/002* (2013.01); *F27D 17/004* (2013.01); *C21C 2005/5282* (2013.01); *Y02P 10/216* (2015.11)

(58) Field of Classification Search
    CPC .... F27B 3/186; F27B 3/19; F27B 3/20; F27B 3/205; F27D 3/1509; F27D 13/002; F27D 17/004
    See application file for complete search history.

(56) References Cited

U.S. PATENT DOCUMENTS

| | | | |
|---|---|---|---|
| 5,117,438 A | 5/1992 | Ehle et al. | |
| 5,889,810 A | 3/1999 | Katayama et al. | |
| 6,596,221 B1 * | 7/2003 | Fuchs | B22D 11/10 222/590 |
| 2002/0005083 A1 * | 1/2002 | Dimitrov | C21C 5/5252 75/10.25 |
| 2002/0009118 A1 | 1/2002 | Mizukami et al. | |
| 2007/0013112 A1 | 1/2007 | Fuchs | |
| 2012/0125152 A1 * | 5/2012 | Sato | C21C 5/5211 75/10.66 |

FOREIGN PATENT DOCUMENTS

| | | |
|---|---|---|
| DE | 8412739 | 3/1986 |
| DE | 10223906 | 4/2003 |
| JP | 07198273 | 8/1995 |
| JP | 08021691 | 1/1996 |
| JP | 09014865 | 1/1997 |
| JP | 10089856 | 4/1998 |
| JP | 10310813 | 11/1998 |
| JP | 2001172713 | 6/2001 |
| JP | 2002350062 | 12/2002 |
| KR | 1019970703521 | 7/1997 |
| KR | 1019980052522 | 9/1998 |
| KR | 1020010106104 | 11/2001 |
| KR | 1020040056268 | 6/2004 |
| KR | 1020040056270 | 6/2004 |
| KR | 1020060096159 | 9/2006 |
| KR | 100931229 | 12/2009 |
| WO | 2009018796 | 2/2009 |

OTHER PUBLICATIONS

International Search Report—PCT/KR2012/011707 dated Jun. 25, 2013.
European Search Report—European Application No. 12890280.6, dated Nov. 13, 2015, citing DE8412739, JPH0914865, KR20040056268, DE10223906.
Chinese Office Action—Chinese Application No. 201280077881.6 dated Apr. 5, 2016, citing JP 8-21691, KR 10-0931229, CN 102212646, JP 7-198273, JP 10-89856 and CN101665848.

* cited by examiner

PRIOR ART

PRIOR ART

FIXED-TYPE ELECTRIC FURNACE AND MOLTEN STEEL PRODUCTION METHOD

TECHNICAL FIELD

The present disclosure relates to a fixed-type electric furnace and a method of producing a molten steel, and more particularly, to a fixed-type electric furnace connected to a low-grade iron oxide preliminary reducing furnace and formed integrally with a vertical preheating furnace, to be capable of steel tapping without tilting of a melting furnace, thus allowing for continuous arcing and tapping operations.

BACKGROUND ART

An electric furnace involving a steelmaking process of melting iron sources such as scrap iron or direct-reduced iron (DRI) using electrical energy and refining the iron sources to targeted components and a target temperature wherein, compared to a converter steelmaking method, initial investment costs are affordable since a blast furnace, a raw material processing system, and a sintering system are not required, and is applicable to the production of special steel or stainless steel for small quantity multi-item production, as well as carbon steel. In addition, the emission of greenhouse gasses such as carbon dioxide is very low during the steelmaking process, about one quarter that of a blast furnace. Furthermore, with the increasing amount of scrap steel available globally, the process is being recognized as a future steel technology in that it is an eco-friendly system that helps to reducing scrap steel.

Increasing oil prices have resulted in increased electricity costs, and this situation has also affected the steelmaking industry using an electric furnace, which has lead to utilizing chemical energy, such as oxygen or natural gas so as to be used as electricity. However, due to limitations thereof, the technical development of reducing power consumption by preheating scraps has occurred.

Preheating scraps is a technique of lowering the amount of power by raising the enthalpy of scraps before the insertion thereof into the electric furnace, which is identical to the technique disclosed in Patent Document 1 below. An integrated preheating electric furnace such as that disclosed in Patent Document 1 is a furnace in which a preheating furnace 2 and a melting furnace 1 are integrated and uses a technique of preheating scrap 3 using waste heat generated in a melting furnace 1 (FIG. 1). However, the entire electric furnace formed integrally with the preheating furnace needs to be tilted in order to decant molten steel 8 produced by an electrode 6 through a tapping port (14). Since the preheating furnace 2 and the melting furnace 1 have to be tilted together, there may be limitations with regard to structural issues and a size of the preheating furnace 2 with respect to tilting.

There is provided another method, as disclosed in Patent Document 2 below, of implementing the vertical preheating furnace 2 and the melting furnace 1 separately. Such an electric furnace is configured so that when charging scrap, the preheating furnace 2 is moved via a transfer part 34 and attached to the melting furnace 1, and when the melting furnace 1 is tilted, the preheating furnace 2 is removed. However, in such a case, a problem does not arise with regard to the volume of the vertical preheating furnace 2, but since the preheating furnace 2 is moved, there is a problem of exhaust gas from the melting furnace 1 being emitted externally or ambient air entering the melting furnace/ preheating furnace. Also, although continuous charging of scrap is possible, the issue of a non-conductive period may arise, with the melting furnace 1 having to be tilted by removing a power inserter during tapping, leading to continuous melting operations and flat bath operations being impossible.

On the other hand, generalized methods such as MIDREX or HYL and the like exist, as a method of reducing iron ore and using the reduced iron ore as a steelmaking raw material in an electric furnace. However, since such methods consume a relatively large amount of time in achieving a target reduction rate, the methods are not applicable to a high-productivity electric furnace having a reduced tap-to-tap time in order to raise productivity by linking a reducing furnace with an electric furnace.

In addition, during an exhaust gas treatment process in a general electric furnace, dioxins, environmental substances, may be created during a combustion process by a substance containing a halogen element group component being mixed with scrap. Thus, in order to remove dioxins, the installation of a combustion tower able to remove such substances from exhaust gas by heating the exhaust gas to a temperature of 900° C. or higher is required.

(Patent Document 1) JP1998-310813 A
(Patent Document 2) KR2006-7012733 A

DISCLOSURE

Technical Problem

An aspect of the present disclosure provides a fixed-type electric furnace and a method of producing a molten steel capable of melting steel without stoppages in the supply of power and continuous operations for producing molten steel in a fixed state.

An aspect of the present disclosure provides an electric furnace and a method of producing a molten steel in which fuel costs may be reduced by preliminarily reducing low-grade iron oxide and using the reduced iron oxide as an iron source, as a substitute for scrap.

An aspect of the present disclosure also provides an electric furnace and a method of producing a molten steel which is capable of removing dioxins created by preheating scrap without a separate combustion tower.

Technical Solution

According to an aspect of the present disclosure, a fixed-type electric furnace and a method of producing a molten steel are provided.

According to an aspect of the present disclosure, a fixed-type electric furnace may include: a preheating furnace disposed on a side of a melting furnace and preheating an iron source (scrap) using exhaust gas from the melting furnace; a supply part supplying the iron source preheated by the preheating furnace to the melting furnace; the melting furnace including electrodes for melting the preheated iron source; and a fixed-type discharge part discharging molten steel melted in the melting furnace, wherein the preheating furnace is integrally connected to the melting furnace.

The fixed-type electric furnace may further include a reducing furnace connected to the preheating furnace and preliminarily reducing an oxidized iron source to provide the iron source to the melting furnace, and the melting furnace may include a carbon injector disposed in a wall surface of the melting furnace to directly reduce the preliminarily reduced iron.

The reducing furnace may be connected to an exhaust gas supply pipe through which the exhaust gas passed through the preheating furnace is supplied to the reducing furnace, and may include a burner that combusts partially-combusted carbon monoxide (CO) in the exhaust gas.

The preheating furnace may be configured as a vertical preheating furnace, the melting furnace may be provided with an oxygen burner disposed in an upper portion of the melting furnace adjacently to the preheating furnace, the oxygen burner heating the exhaust gas moving to the preheating furnace, and the preheating furnace may preheat discharged iron source to a temperature between 600-800° C.

Here, the preheating furnace may be a large-scale preheating furnace having an internal volume equal to 80-150% of a tapping amount of the fixed-type electric furnace.

The preheating furnace may include an iron source supply port formed in the upper portion of the preheating furnace, and a pusher may be disposed in the lower portion of the preheating furnace to supply preheated iron source to the melting furnace from the preheating furnace.

The iron source supply port may include a first gate adjusting a supply amount of iron source and a second gate disposed above the first gate, the first gate and the second gate may include a space portion formed therebetween and temporarily storing the iron source, and the first gate may be provided with an exhaust gas discharge port formed in a side surface below the first gate.

In addition, the fixed-type discharge part may be a siphon tapping port, and the siphon tapping port may include: a molten steel inflow portion that may be formed to be extended from a bottom surface of the melting furnace to a bending portion located higher than the bottom surface of the melting furnace; a bending portion to which the molten steel inflow portion and the molten steel discharge portion are connected; and the molten steel discharge portion extended downwardly from the bending portion, and having a discharge portion located to be lower than a position of the bottom surface of the melting furnace, the bending portion being connected to a gas supply portion.

In addition, at least one of the molten steel inflow portion, the bending portion, and the molten steel discharge portion may include a burner or an induction heating coil installed to prevent solidification of molten steel passing therethrough.

According to an aspect of the present disclosure, a method of producing molten steel by mixing low-grade iron oxides and scrap is provided, the method including: charging a scrap charging port of a preheating furnace with scrap and charging a melting furnace with the preheated scrap; reducing the low-grade iron oxides by allowing a direct and/or indirect reducing reaction to occur in the low-grade iron oxides through formation of a reducing atmosphere, and discharging the reduced iron to the melting furnace; performing continuous melting of the scrap and the reduced iron from the preheating surface and a reducing furnace through electrodes during a steelmaking period; and continuously tapping the generated molten steel.

The charging of the scrap may be performed by temporarily storing the charged scrap in a space between a first gate and a second gate, and charging the electric furnace with the scrap after preheating the scrap with sensible heat from exhaust gas generated by the electric furnace and CO secondary combustion heat, and the reducing of the low-grade iron oxides may be performed by stuffing cinder briquettes formed by mixing carbon with dust or scales into an iron oxide stuffing port.

In addition, in the reducing of the low-grade iron oxides, the reducing atmosphere may be formed by sensible heat from exhaust gas from the preheating furnace and combustion heat of a burner.

Furthermore, the method of producing a molten steel may further include performing a direct reduction by spraying carbon onto the reduced iron using a carbon injector connected to a wall of the electric furnace when the electric furnace is charged with the reduced iron to react with the reduced iron, and the charging of the scrap may be performed by preheating the scrap to a temperature between 600-800° C. by the burner disposed within the preheating furnace.

Advantageous Effects

A fixed-type electric furnace and a method of producing a molten steel according to an exemplary embodiment in the present disclosure are provided in the configuration described above. Production costs may be reduced by using low price iron sources such as low-grade iron oxides together with scrap and removing dioxins without an additional combustion furnace by using exhaust gas during reduction.

In addition, molten steel may be continuously supplied without stoppages in the supply of power, and tapping may be performed through a siphon tapping port without tilting in the flat bath state.

BEST MODE

Hereinafter, embodiments in the present disclosure will be described in detail with reference to the accompanying drawings.

Figure 1:
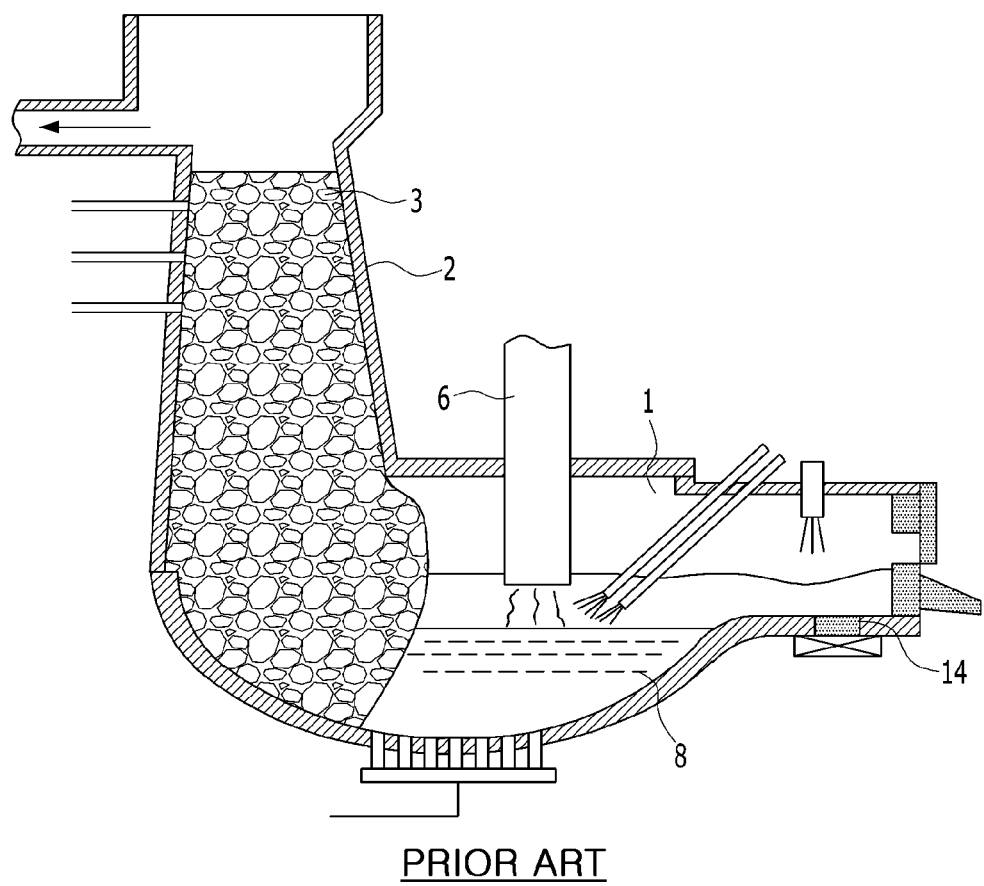
FIG. 1 is a schematic view of an electric furnace according to the related art.
Figure 2:
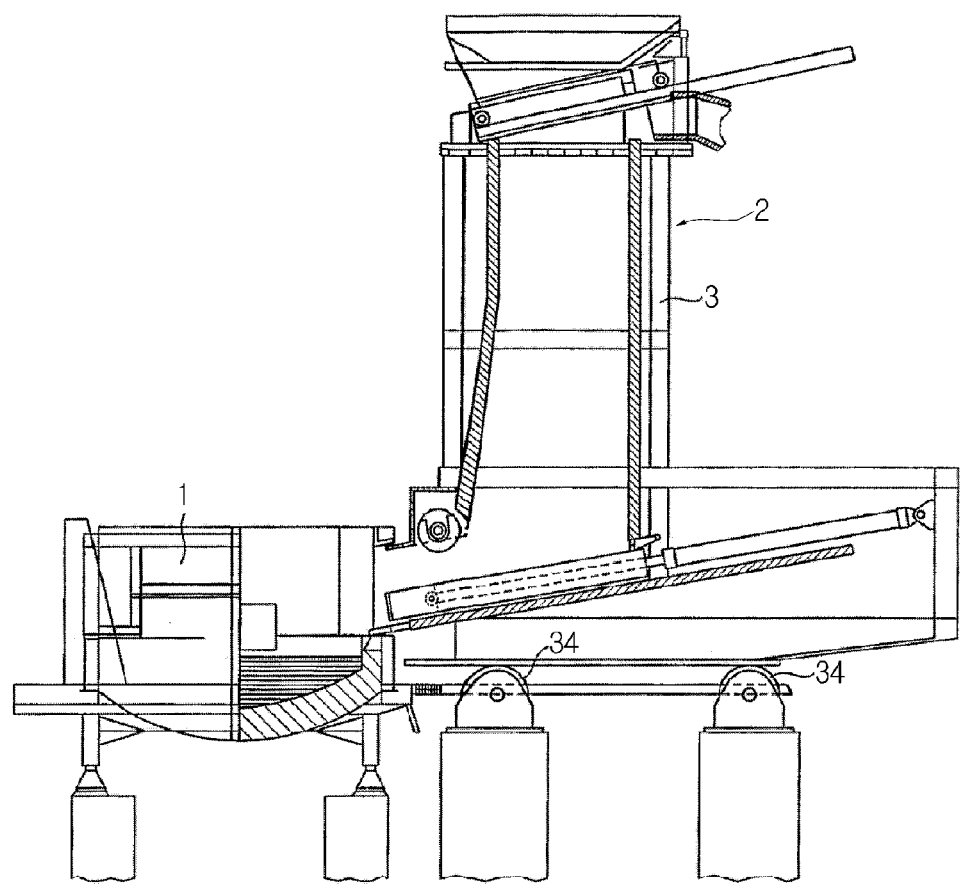
FIG. 2 is another schematic view of an electric furnace according to the related art.
Figure 3:
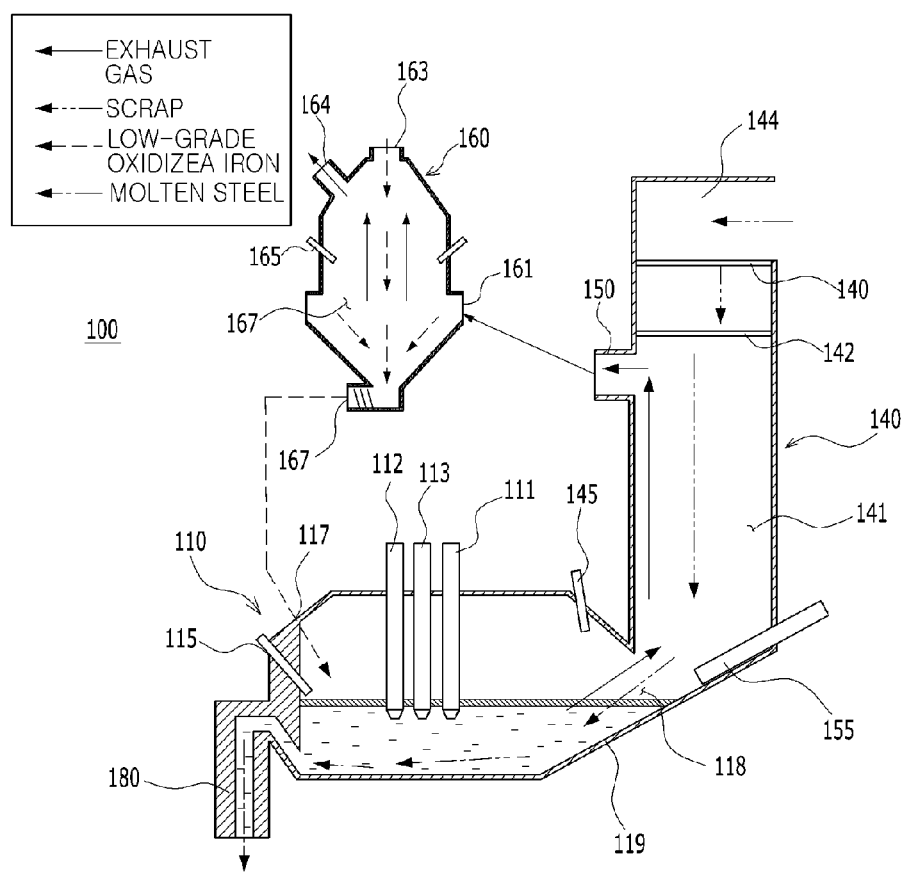
FIG. 3 is a schematic view of a fixed-type electric furnace according to an exemplary embodiment in the present disclosure.
Figure 4:
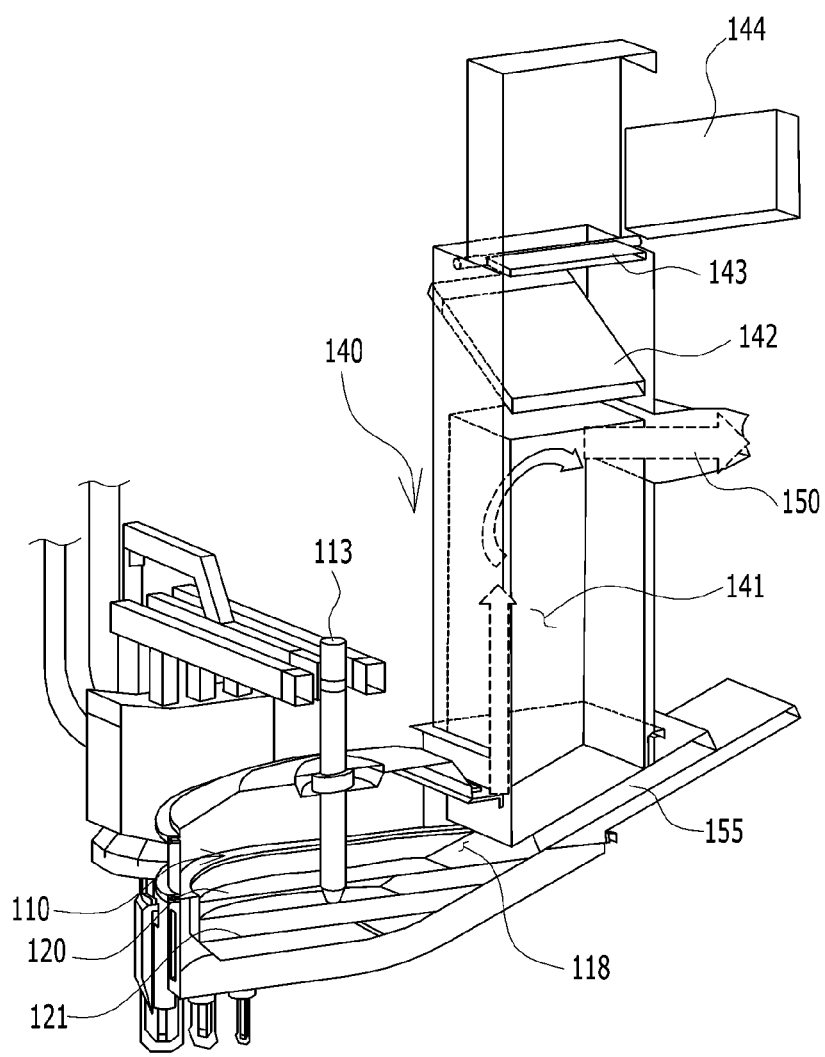
FIG. 4 is a cross-sectional view of a fixed-type electric furnace according to an exemplary embodiment in the present disclosure.

FIG. 3 illustrates a schematic view of a fixed-type electric furnace 100 according to an exemplary embodiment in the present disclosure, and FIG. 4 illustrates a cross-sectional view of a fixed-type electric furnace according to an exemplary embodiment in the present disclosure.

As illustrated in FIG. 3 and FIG. 4, the fixed-type electric furnace 100 largely includes a melting furnace 110 that produces molten steel by melting scrap or reduced iron oxides using electrodes 111-113, a preheating furnace 140 connected to one side of the melting furnace 110 that preheats scrap placed therein by utilizing exhaust gas produced by the melting furnace 110, and a reducing furnace 160 that reduces dust or low-grade iron oxides such as scales by utilizing exhaust gas having passed through the preheating furnace 140 and provides reduced iron oxides (reduced iron) to the melting furnace 110.

The preheating furnace 140 is connected to one side of the melting furnace 110, and a fixed-type discharge part that taps molten steel in a fixed state thereof, for example, a siphon tapping port 180 is connected to the other side thereof. A reduced iron inflow portion 117 through which reduced iron flows is formed on the upper portion of the melting furnace 110, and a carbon injector 115 that sprays carbon onto the reduced iron is disposed in the vicinity of the reduced iron inflow portion 117. The carbon injector 115 sprays carbon onto reduced iron, and a direct reduction is caused by the reaction of carbon and reduced iron.

The melting furnace 110 melts iron sources (scrap, reduced iron oxide) within the melting furnace through an arc between three electrodes 111, 112, 113 in the center. The melting furnace 110 and the preheating furnace 140 are connected by an inclined surface 119, and scrap in the preheating furnace 140 flows into the melting furnace 110 along the inclined surface 119. Inside the melting furnace 110, a burner 145 may be disposed adjacently to a scrap charging port 118 which connects the melting furnace 110 and the preheating furnace 140.

Since the burner 145 is provided adjacently to the entrance of the preheating furnace 140, inside the melting furnace 110, a flame may be easily formed due to the absence of scrap at the outlet of the burner 145. Also, at this point, the burner 145 only supplies oxygen, and in a case in which only oxygen is supplied, the exhaust gas may react with partially combusted carbon monoxide (CO), as the exhaust gas may be in a high temperature state (1000-2300° C.). Here, since no fuel (CxHy) is added, no steam is released from a hydrogen and oxygen reaction, and thus, a filter blockage caused by moisture mixed with dust during dust collection may be prevented.

Hereinafter, the preheating furnace 140 will be described. The preheating furnace 140 may have the inclined surface 119 formed at a predetermined angle with respect to the lower surface thereof so that scrap is supplied to the melting furnace 110, and an iron source supply portion 144 provided in an upper portion thereof. The preheating furnace 140 in the present disclosure may be a vertical type preheating furnace 140 having a preheating space 141 in a vertical direction. Since the preheating furnace 140 according to an exemplary embodiment in the present disclosure does not tilt, the preheating furnace 140 may be a large scale preheating furnace 140 capable of holding an amount of scrap equivalent to 80-150% of the tapping amount of the electric furnace.

The internal space 141 of the preheating furnace 140 may be filled with scrap, and a first gate 142 and a second gate 143 may be disposed between the iron source supply portion 144 and the internal space 141 to prevent exhaust gas leakage during the filling of scrap. Also, an exhaust gas outlet 150 may be disposed on the lower portion of the first gate 142 so that exhaust gas that flows in along the inclined surface 119 of the lower surface may be discharged to the reducing furnace. Since the exhaust gas outlet 150 may be disposed directly below a lower portion of the first gate 142 which supplies iron source, the exhaust gas may be sent to the reducing furnace 160 after preheating all of the scrap in the internal space 141 of the preheating furnace 140.

The preheating furnace 140 according to an exemplary embodiment in the present disclosure may preheat scrap filled in the internal space 141 with CO secondary combustion heat heated by the burner 145 and sensible heat from exhaust gas which flows in from the scrap charging port 118. The burner 145 is illustrated as being disposed adjacently to the scrap charging port 118 in the melting furnace 110 in the exemplary embodiment of FIG. 3, but may also be disposed inside the preheating furnace 140 instead of being disposed in the melting furnace 110. However, in a case in which the scrap charging port 118, wherein scrap flows into the preheating furnace 140, is heated, it may be advantageous that the overall preheating temperature may be raised.

A supply part that pushes scrap from the lower portion of the preheating furnace 140, for example, a pusher 155 may be disposed on the inclined surface 119 of the lower portion of the preheating furnace 140. The pusher 155 may be connected to a driving part such as a piston cylinder, and may push scrap of the lower portion into the melting furnace 110 by being moved left to right along the inclined surface 119.

The preheating furnace 140 according to the exemplary embodiment in the present disclosure may provide the scrap provided therein to the melting furnace 110 after heating the scrap at 600-800° C. In a case when scrap is heated below 600° C., the temperature of the scrap may be insufficient, to thus fall short of achieving a fuel reducing effect. Therefore, scrap may be heated to a temperature of 600° C. or higher.

On the other hand, the operation of the first and second gates 142 and 143 will be described later with reference to FIGS. 5 through 7.

In a reducing furnace 160, an iron oxide supply port 163 that supplies iron oxide and an exhaust port 164 may be disposed in the upper portion thereof, a reduced iron discharge port 167 that discharges reduced iron may be disposed in the lowermost portion thereof, and an exhaust gas inlet 161 through which exhaust gas discharged from the exhaust gas outlet 150 of the preheating furnace 140 is introduced into the reducing furnace 160 may be disposed in a lower portion of a side thereof. In addition, a burner 165 may be disposed on an inner side surface of the reducing furnace 160.

The reducing furnace 160 may heat exhaust gas having passed through the preheating furnace 140 but having a large amount of heat and partially combusted CO included in the exhaust gas, using the burner 165. Here, the reducing furnace 160 heats at a temperature of 900° C. or higher, whereby harmful substances such as dioxins may be removed. In further detail, heating temperature in the reducing furnace 160 may be between 800-1300° C. Further, cinder briquettes composed of dust or low-grade iron oxides such as scales mixed with carbon may be supplied through the iron oxide supply port 163, and such cinder briquettes may be directly/indirectly reduced by creating a reducing atmosphere through sensible heat from the exhaust gas and burner combustion heat.

Figure 5:
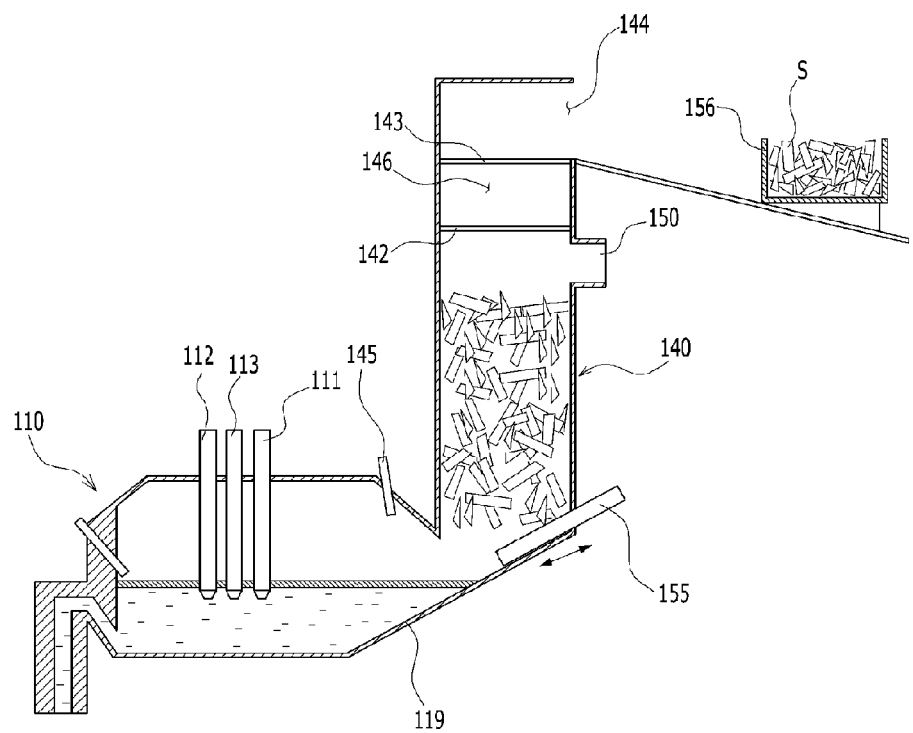
FIGS. 5 through 7 are views illustrating a process of scrap being supplied in a fixed-type electric furnace according to an exemplary embodiment in the present disclosure.
Figure 6:
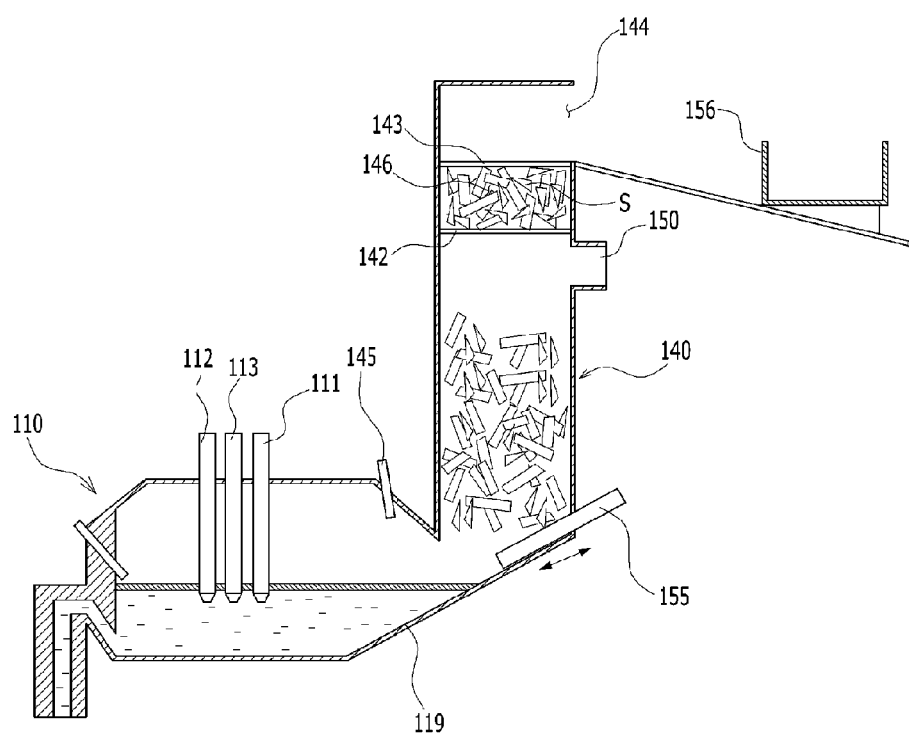
Figure 7:
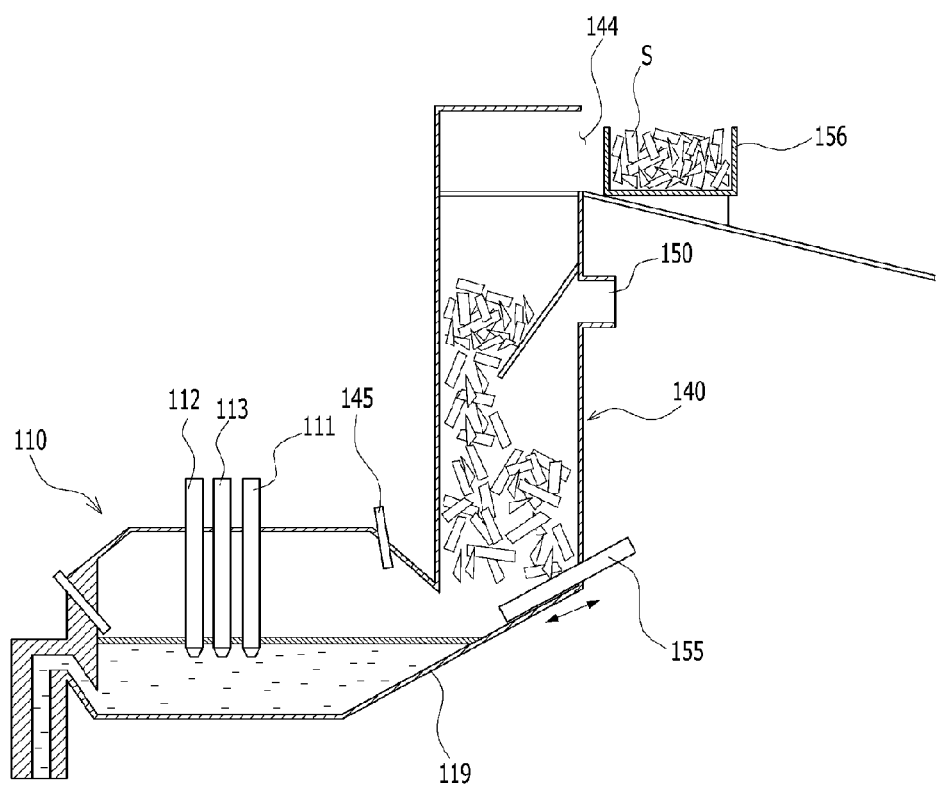

Furthermore, FIGS. 5 through 7 are views illustrating a process of supply of iron source, for example, scrap, in the preheating furnace 140.

In order to supply scrap S to the preheating furnace 140, a bucket 156 carrying scrap S may be moved to the iron source supply portion 144, and subsequently, the scrap S in the bucket 156 may be supplied to a temporary space portion 146 between the first gate 142 and the second gate 143 through the open second gate 143. Subsequently, the second gate 143 may close, and the scrap S stored in the temporary space portion 146 may be supplied to the internal space 141 as the first gate 142 opens after the second gate 143 closes.

The first gate 142 may serve as a support that temporarily stores the scrap S charged from the upper portion of the preheating furnace, and may prevent the equipment from being damaged due to high temperature exhaust gas not passing out through the exhaust gas outlet 150 and rising from the lower portion being discharged upwardly. The second gate 143 may prevent the scrap S stored in the temporary space portion 146 from passing outside along with dust and waste heat rising from the first gate 142 opening.

The exhaust gas of the preheating furnace 140 may pass out through the exhaust gas outlet 150, without being leaked externally, through the use of the first and second gates 142, 143.

Figure 8:
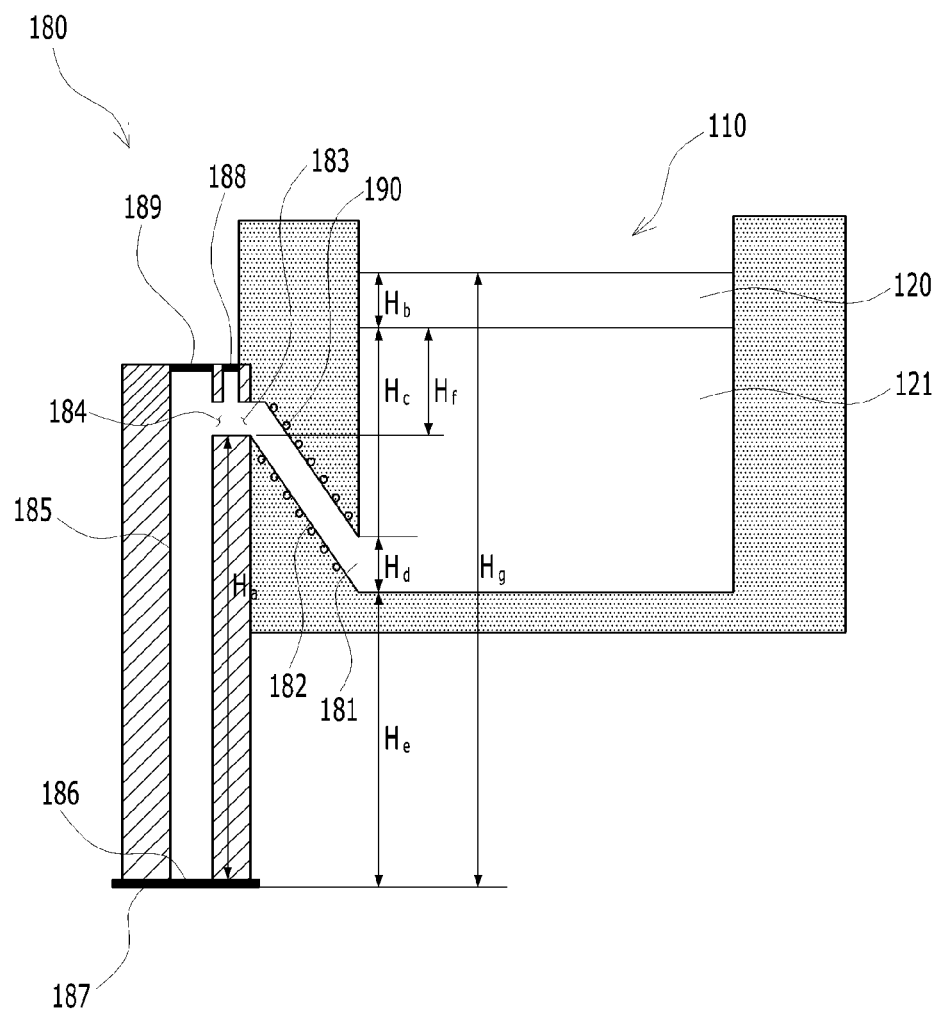
FIG. 8 is a schematic view of a siphon tapping port according to an exemplary embodiment in the present disclosure.

On the other hand, FIG. 8 illustrates a siphon tapping port 180 according to an exemplary embodiment in the present disclosure. As illustrated in FIG. 8, the siphon tapping port 180 may be formed on the side surface of the melting furnace 110. The siphon tapping port 180 may include an escape portion including an escape inlet 181 disposed adjacently to the lower surface of the melting furnace, an escape outlet 183 located in a position higher than the escape inlet 181, and an escape pipe 182; and a tapping pipe including a tapping inlet 184 attached to a side surface of the melting furnace 110 and connected to the escape pipe 182 so as to be connected to the escape portion, and a tapping outlet 186 disposed in a location below the tapping inlet 184 and the escape inlet 181.

Here, the tapping pipe 185 and the escape pipe 182 may be connected in a bent manner with respect to each other, and a gas supply portion 188 that may stop tapping by injecting inert gas may be connected to an upper portion of a connecting portion connecting the tapping pipe 185 and the escape pipe 182 to each other. Further, a sand supply portion 189 into which sand may be introduced may be connected to the upper surface of the connecting portion, and the sand supply portion 189 may be disposed adjacently to the gas supply portion 188. The sand supply portion 189 may be disposed on the upper surface of the vertically formed tapping pipe 185.

Furthermore, an opener 187 may be provided on the tapping outlet 186 so that a melted metal may be stored therein prior to tapping.

On the other hand, an induction heating coil 190 may be provided in at least one of the tapping pipe 185 or the escape pipe 182 to prevent solidification of passed molten steel 121. Although FIG. 8 illustrates the case in which the heating coil 190 is provided on the escape pipe 182, the induction heating coil may only be provided on the tapping pipe 185 or on both the tapping pipe 185 and escape pipe 182.

A distance Ha from the siphon tapping inlet 184 to the tapping outlet 186 in the siphon tapping port 180 may be between 1000-2500 mm, and the diameter of the escape pipe 182 and the tapping pipe 185 may be between 100-300 mm. In a case in which the diameter of the escape pipe and the tapping pipe 182, 185 is less than 100 mm, cooling of molten steel may progress rapidly and may solidify within the tapping pipe, and in a case in which the diameter is more than 300 mm, the scales of the installment may become excessively large, losing practicality.

When discharging molten steel through the siphon tapping port 180, a slag 120 interface in the interior of the melting furnace 110 may consistently be located in a position higher than the escape inlet 181, and may tap molten steel in a state in which the height Hc from the molten steel 121 interface to the escape inlet 181 is 1.5 times or greater than the diameter of the tapping pipe 185 or the escape pipe 182. Here, the height from the escape inlet 181 to the molten steel 121 interface may be measured from the upper portion of the escape inlet 181. In a case in which the height Hc from the molten steel 121 interface to the escape inlet 181 is less than 1.5 times the diameter of the tapping pipe 185 or the escape pipe 182, a vortex may occur, resulting in the slag 120 being discharged to the molten steel tapping port.

When the melting furnace 110 is charged with scrap, the siphon tapping port 180 according to an exemplary embodiment in the present disclosure may close the gas supply portion 188 and the sand supply portion 189 in a state in which the opener 187 of the siphon tapping port 180 is closed, after sand is filled to a level of at least 200 mm or more through the sand supply portion 189. Subsequently, a melting and refining operation may be carried out in the melting furnace 110. At the time of tapping, the sand filled in the tapping pipe 185 may be externally discharged by opening of the opener 187, such that molten steel may flow through the tapping pipe 185.

In addition, when tapping is finished, the opener 187 may be closed in a state in which gas is supplied from the gas supply pipe, and after sand is filled in the tapping port through the sand supply portion 189, the tapping pipe 185 filled with sand may be pressurized. In the case of re-use thereof, molten steel may be allowed to flow through the tapping pipe 185 by opening the opener 187 and discharging sand filled in the tapping pipe 185 externally.

An operation of the fixed-type electric furnace will be described hereinafter with reference to FIGS. 3 through 8. According to the order of FIGS. 5 through 7, the preheating furnace 140 may be charged with the scrap S in the electric furnace 100. In detail, scrap S may be introduced into a bucket 156 by opening the second gate 143 so as to be stored in the temporary space portion 146, and then, the scrap S may be supplied to the internal space 141 of the preheating furnace 140 by closing the second gate 143 and opening the first gate 142.

The scrap S collected in the internal space 141 of the preheating furnace 140 may be supplied to the melting portion 110 through the scrap charging port 118 (scrap charging stage). Here, scrap in the lower portion of the heating furnace 140 may be pushed into the melting portion 110 through the pusher 155.

On the other hand, at the same time or at a different time, the reduced iron preliminarily reduced in the reducing furnace 160 may be supplied to the melting furnace 110 through the reduced iron supply portion 117. Before supplying the reduced iron to the melting furnace 110, the reducing furnace 160 charges cinder briquettes formed by mixing carbon with dust or scales while forming a reduction atmosphere through sensible heat from exhaust gas passed through the preheating furnace 140 or combustion heat of the burner 165, and directly or indirectly reduces the cinder briquettes (iron oxide reducing stage).

According to an exemplary embodiment in the present disclosure, the melting furnace 110 may melt the iron source, scrap, or reduced iron supplied from the preheating furnace 140 and the reducing furnace 160 through electrodes 111-113. When reduced iron is supplied to the melting furnace 110 from the reducing furnace 160, a direct reduction may take place by spraying carbon with a carbon injector 115 inside the melting furnace 110 (direct reducing stage).

The electrodes 111-113 may generate molten steel by continuous arcing in the melting furnace 110, and the molten steel 121 generated by the electrodes 111-113 may be discharged through the siphon tapping port 180 located on one side of the melting furnace 110. In detail, the siphon tapping port 180 in the present disclosure may discharge molten steel while the arc is formed.

Figure 9:
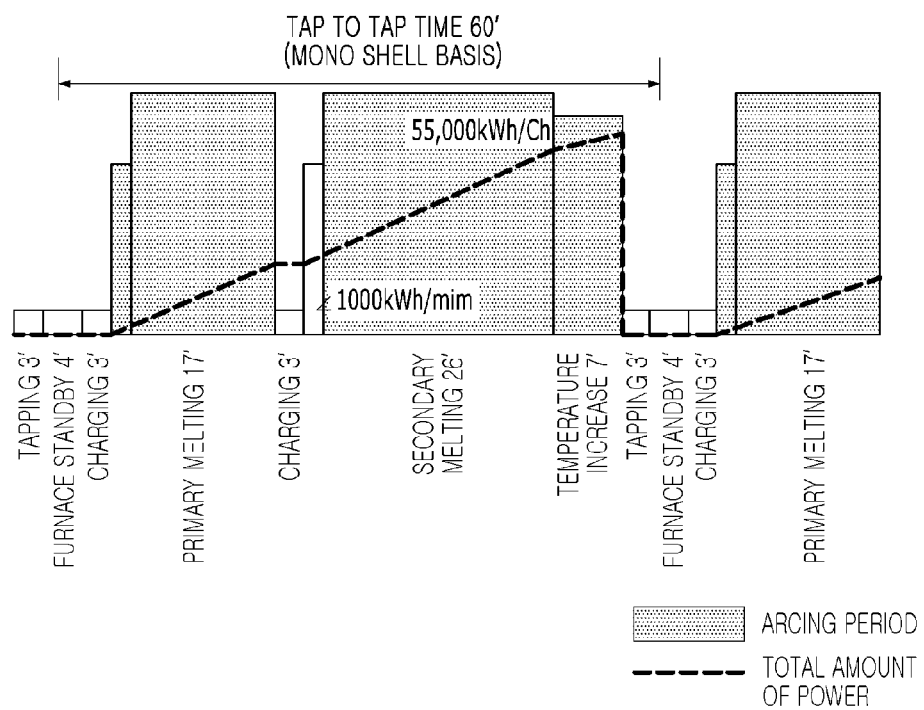
FIG. 9 is a graph illustrating an arcing time and electrical energy of an electric furnace according to the related art.
Figure 10:
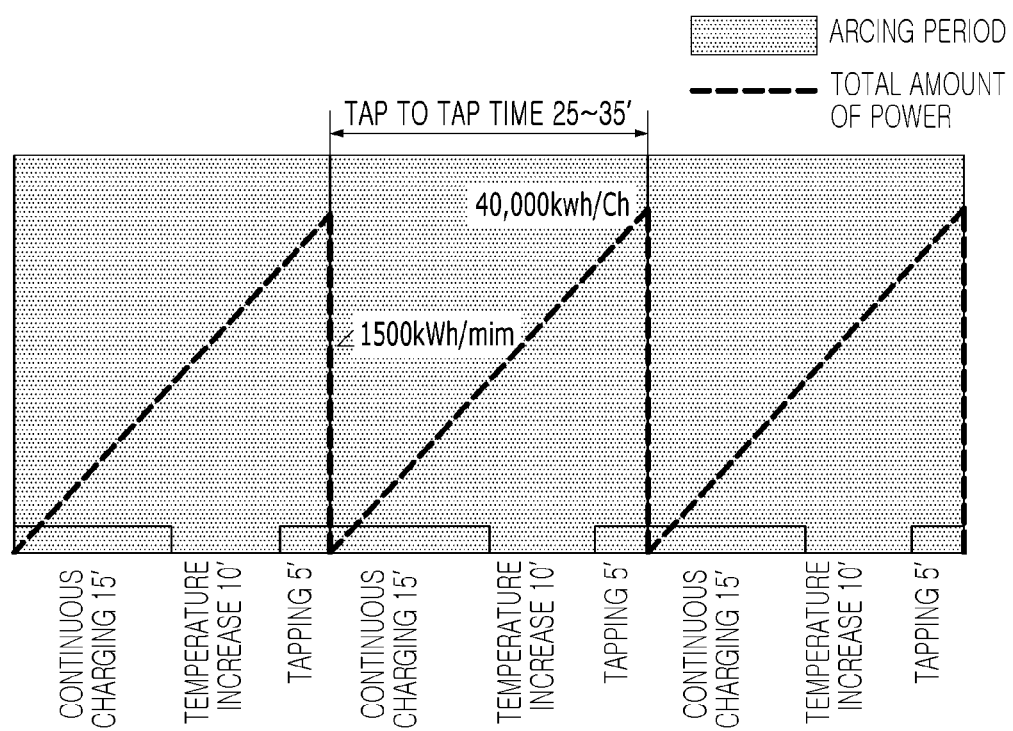
FIG. 10 is a graph illustrating an arcing time and electrical energy of an electric furnace according to an exemplary embodiment in the present disclosure.

FIGS. 9 and 10 illustrate an operation of an electric furnace according to the related art and the electric furnace according to an exemplary embodiment in the present disclosure.

Firstly, as illustrated in FIG. 10, the fixed-type electric furnace 100 may maintain a balance in energy when the preheating furnace 140 is charged with an amount of scrap S corresponding to the tapping amount of the electric furnace and the melting furnace 110 is charged with the preheated scrap S within a tap-to-tap time of between 25-35 minutes.

Examining the time more specifically, scrap may be transported to the iron source supply portion 144 on the upper portion of the preheating furnace 140 using the bucket 156. Here, a single transport amount may be 8-12% of the tapping amount per turn of a cycle of 2.5-3.5 minutes. The transporting amount per turn and the cycle may be adjusted according to the tapping amount. The scrap inserted into the preheating furnace 140 may be preheated by sensible heat from exhaust gas generated in the melting furnace 110 attached to a side surface of the lower portion of the preheating furnace and combustion heat of the burner 145 for the secondary combustion of CO among exhaust gas components. The temperature within the preheating furnace 140 may rise up to 600-800° C. towards the lower portion of the preheating furnace immediately before the charging of the scrap into the electric furnace. The amount of scrap charging into the melting furnace 110 may be 2-3% of the tapping amount per turn, and the charging cycle may be set to 0.5-1.5 minutes.

As disclosed above, scrap charging may occur periodically during a tap-to-tap time, however, charging may not take place in the last scheduled time for a refining process.

As illustrated in FIGS. 9 and 10, because tilting is not required, there may be no need for an additional tilting period, and since a fixed-type tapping structure, for example, the siphon tapping port 180 is included, tapping may also be performed during arcing. Therefore, since a tap-to-tap time may be significantly reduced compared to that of an electric furnace according to the related art, productivity may be improved with the increase in throughput per hour.

Unlike an electric furnace coupled with a preheating furnace thereto, since tilting is not required in the present disclosure, the preheating furnace 140 may be a large-scale preheating furnace holding an amount of scrap equivalent to 80-150% of a tapping amount the electric furnace, and furthermore, since the electric furnace in the present disclosure is manufactured integrally, there may be no concern of outside air flowing in or internal air leaking externally.

In addition, since the electric furnace according to an exemplary embodiment in the present disclosure is a fixed-type, scrap may easily be inserted and preheated precisely, and since continuous operation may be allowable through the siphon tapping port in a fixed structure, a production amount may be increased with the reduction of tap-to-tap times due to the elimination of tapping operation interruptions and preparations therefor.

Furthermore, since iron oxides may be used as iron sources along with scrap, the production cost of iron source may also be reduced, and instead of a combustion furnace used for the removal of toxic substances after preheating with exhaust gas, toxic substances may be removed with the burner 165 in the reducing furnace 160. In addition, the reducing furnace 160 may create a reduction atmosphere with the combustion heat of the burner 165 and sensible heat from exhaust gas to raise efficiency of energy.

While exemplary embodiments have been shown and described above, it will be apparent to those skilled in the art that modifications and variations could be made without departing from the scope of the invention as defined by the appended claims.

The invention claimed is:

1. A fixed-type electric furnace comprising:
   a melting furnace having an iron source charging port formed at one side thereof and a reduced iron supply portion formed at the other side thereof,
   a preheating furnace preheating an iron source to form a preheated iron source and connected to the melting furnace through the iron source charging port, the preheating furnace including an exhaust gas outlet, wherein the preheated iron source is supplied to the melting furnace through the iron source charging port, and an exhaust gas is supplied from the melting furnace to the preheating furnace through the iron source charging port and exhausted through the exhaust gas outlet after preheating the iron source;
   a reducing furnace reducing an iron oxide to form a reduced iron oxide, the reducing furnace including an exhaust gas inlet and a reduced iron discharging port, wherein the exhaust gas exhausted from the preheating furnace is supplied to the reducing furnace through the exhaust gas inlet, and the reduced iron oxide is supplied to the melting furnace through the reduced iron discharging port and the reduced iron supply portion;
   an electrode installed in the melting furnace to melt the preheated iron source and the reduced iron oxide to produce a molten steel; and
   a molten steel discharge part fixed to the melting furnace to discharge the molten steel from the melting furnace, wherein the melting furnace includes a carbon injector to directly further reduce the reduced iron oxide being supplied into the melting furnace, and
   the reducing furnace comprises a burner that combusts partially-combusted carbon monoxide (CO) in the exhaust gas.

2. The fixed-type electric furnace of claim 1, wherein the preheating furnace is formed of a vertical preheating furnace,
   the melting furnace includes an oxygen burner disposed adjacent to the preheating furnace to heat the exhaust gas moving to the preheating furnace, and
   the preheating furnace preheats the iron source to a temperature between 600-800° C.

3. The fixed-type electric furnace of claim 1, wherein the preheating furnace has an internal volume equal to 80-150% of a tapping amount of the fixed-type electric furnace.

4. The fixed-type electric furnace of claim 1, wherein the preheating furnace includes an iron source supply portion formed in an upper portion of the preheating furnace, and a pusher disposed in a lower portion of the preheating furnace to supply the preheated iron source to the melting furnace from the preheating furnace.

5. The fixed-type electric furnace of claim 4, wherein the iron source supply portion includes a first gate adjusting a supply amount of iron source and a second gate disposed above the first gate, the first gate and the second gate forms a space portion therebetween temporarily storing the iron source, and the exhaust gas outlet is formed below the first gate.

6. The fixed-type electric furnace of claim 1, wherein the molten steel discharge part is a siphon tapping port.

7. The fixed-type electric furnace of claim 6, wherein the siphon tapping port comprises:
- an escape pipe upwardly extended from a bottom surface of the melting furnace, the escape pipe including an escape inlet and an escape outlet;
- a tapping pipe connected to the escape pipe and downwardly extended, the tapping pipe including a tapping inlet connected with the escape outlet and a tapping outlet formed at a position lower than the bottom surface of the melting furnace; and
- a gas supply portion provided between the escape outlet and the tapping inlet.

8. The fixed-type electric furnace of claim 7, wherein the siphon tapping port further comprises: an induction heating coil installed in at least one or both of the escape pipe and the tapping pipe to prevent solidification of the molten steel passing therethrough.

* * * * *